United States Patent
Shiiyama

(10) Patent No.: US 7,027,646 B2
(45) Date of Patent: Apr. 11, 2006

(54) SCALED IMAGE GENERATING APPARATUS AND METHOD, IMAGE FEATURE CALCULATING APPARATUS AND METHOD, COMPUTER PROGRAMS THEREFOR, AND IMAGE DATA STRUCTURE

(75) Inventor: Hirotaka Shiiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 743 days.

(21) Appl. No.: 10/103,627

(22) Filed: Mar. 22, 2002

(65) Prior Publication Data

US 2003/0026476 A1 Feb. 6, 2003

(30) Foreign Application Priority Data

Mar. 26, 2001 (JP) .............................. 2001-088483
Jan. 28, 2002 (JP) .............................. 2002-018936

(51) Int. Cl.
*G06K 9/00* (2006.01)
(52) U.S. Cl. ........................ 382/168; 382/250; 382/298
(58) Field of Classification Search ........ 382/166–168, 382/190–250, 298–300, 305; 348/395.1, 348/403.1; 358/403; 707/3
See application file for complete search history.

(56) References Cited

U.S. PATENT DOCUMENTS 4,862,260 A * 8/1989 Harradine et al. .......... 348/699
5,577,135 A * 11/1996 Grajski et al. .............. 382/253
5,652,881 A * 7/1997 Takahashi et al. ........ 707/104.1
5,659,490 A * 8/1997 Imamura .................... 358/500
6,128,407 A * 10/2000 Inoue et al. ................ 382/167
6,377,702 B1 * 4/2002 Cooper ....................... 382/167
6,424,738 B1 * 7/2002 Katsumura et al. ......... 382/165

FOREIGN PATENT DOCUMENTS

JP 08331373 A * 12/1996

OTHER PUBLICATIONS

U.S. Appl. No. 09/503,481, filed Feb. 14, 2000.
U.S. Appl. No. 09/621,682, filed Jul. 21, 2000.

* cited by examiner

Primary Examiner—Kanjibhai Patel
Assistant Examiner—Yubin Hung
(74) Attorney, Agent, or Firm—Fitzpatrick, Cella, Harper & Scinto

(57) ABSTRACT

An apparatus for generating a scaled image divides an image, which comprises a plurality of pixels, into a plurality of blocks by partitioning the image vertically and horizontally, whereby the color space of this image is divided into a plurality of subspaces, referred to as bins. The apparatus applies a histogram analysis, on a bin-by-bin basis, to the pixels constituting a block of interest among the plurality of blocks. Then, using the result of the histogram analysis, the apparatus decides the representative color of the block of interest in accordance with the average color of pixels belonging to a most frequent bin among the plurality of bins. A scaled image of this image is obtained by applying the above operation to all of the blocks.

10 Claims, 14 Drawing Sheets

FIG. 12

| IMAGE ID | IMAGE-FILE STORAGE ADDRESS | THUMBNAIL IMAGE DATA | COLOR LAYOUT DESCRIPTOR | OTHER IMAGE ATTRIBUTES |
|---|---|---|---|---|

SCALED IMAGE GENERATING APPARATUS AND METHOD, IMAGE FEATURE CALCULATING APPARATUS AND METHOD, COMPUTER PROGRAMS THEREFOR, AND IMAGE DATA STRUCTURE

FIELD OF THE INVENTION

The present invention relates to the field of image processing for obtaining feature values from an original image (input image) and utilizing these feature values. More particularly, the invention relates to the field of image processing for scaling an original image.

BACKGROUND OF THE INVENTION

A variety of image processing is executed in the prior art by obtaining the feature values of an original image and then utilizing these feature values to execute the processing.

One example of a method of obtaining such a feature value from an original image involves dividing the original image (the input image) into blocks of vertical and horizontal numbers of pixels that are to undergo scaling, and calculating the mean values of the pixels (pixel values) within a plurality of the block images produced by the aforementioned division, thereby generating a scaled image of the original image. The scaled image thus produced is then subjected to the well-known discrete cosine transform ("DCT" below) and quantization processing, as a result of which coefficients are obtained. Several coefficients from the side of low-frequency components are extracted from these coefficients as a feature of the original image. The feature thus extracted can be employed as data used in an image search. [See ISO/IEC JTC1/SC29/WG11/N3522 "MPEG-7 Visual Working Draft 4.0" (VWD 4.0) or ISO/IEC JTC1/SC29/WG11/N3522 "MPEG-7 Visual part of experimentation Model Version 7.0" (VXM 7.0).]

The conventional procedure for extracting feature values will be described. FIG. 1 is a diagram useful in describing the flow of processing for extracting a color layout descriptor value. This procedure is described in VWD 4.0 or VXM 7.0. FIG. 3 is a flowchart illustrating the processing for extracting a color-layout descriptor value.

In FIGS. 1 and 3, an original image 10001 is scaled to a plurality of blocks of 8×8 pixels each (step S10201). When the scaled image of the original image is produced, use is made of the mean value of the pixels within each block obtained by dividing the original image into vertical and horizontal numbers of pixels that are the target of scaling.

The pixels constituting the generated block images (10011, 10012, 10013) of 8×8 pixels each are converted to data (10021, 10022, 10023) in Y, Cb, Cr color space (step S10202).

Next, the data 10021, 10022, 10023 representing the components in Y, Cb, Cr color space is subjected to DCT processing (step S10203), whereby DCT coefficients 10031, 10032, 10033 are acquired, and the DCT coefficients 10031, 10032, 10033 are then subjected to quantization (step S10204).

In accordance with VWD 4.0 or VXM 7.0, the above-mentioned image scaling processing, color conversion processing and DCT processing may be implemented through well-known techniques and the processing is not particularly standardized.

Further, with regard to image scaling processing, VWD 4.0 or VXM 7.0 merely recommend dividing the original image into blocks of 8×8 pixels each and adopting the average color of the pixels within each block. For example, in accordance with VWD 4.0, quantization processing for DC components differs from that for AC components with regard to the Y component and Cb/Cr components.

Next, several coefficients are selected from the side of low-frequency components among the quantized DCT coefficients (10041, 10042, 10043) obtained as a result of quantization processing (step S10205). In the example of FIG. 1, six coefficients (10051) have been selected with regard to the coefficients of the Y component, and three coefficients each (10052, 10053) have been selected with regard to the coefficients of the Cb/Cr components.

FIG. 2 is a diagram useful in describing zigzag-scan processing for selecting coefficients. As exemplified in FIG. 2, the selection of coefficients at step S10205 is achieved by rearranging the coefficients, which are arrayed two-dimensionally as indicated by the 8×8 pixel configuration, into a one-dimensional array by zigzag scanning, and selecting several coefficients starting from the leading coefficient. The numerals 1 to 64 written in the blocks of FIG. 2 indicate which numbers the coefficients will come to occupy starting from the leading coefficient after the coefficients have been rearranged one-dimensionally.

In accordance with VWD 4.0, the coefficients that should be selected in the coefficient selection process are any of 1, 3, 6, 10, 15, 21, 28 and 64. Though the numbers of coefficients are the same for the Cb-component coefficients and Cr-component coefficients, it is possible for the number of Y-component coefficients to be set to a number different from that of the Cb/Cr-component coefficients. With VWD 4.0, the default selection is six coefficients with regard to the Y-component coefficients and three coefficients for each of the Cb/Cr-component coefficients. In other words, VWD 4.0 adopts feature data (a color layout descriptor value) representing the color layout of the original image 1001 using the selected coefficients 10051, 10052, 10053.

If use is made of color layout descriptor values calculated as set forth above with regard to a plurality of images, similar images can be retrieved. The degree of similarity between items of feature data is calculated as follows in accordance with VXM 7.0. For example, degree of similarity D between a color layout descriptor value CLD1 (YCoeff, CbCoeff, CrCoeff) and a color layout descriptor value CLD2 (YCoeff', CbCoeff', CrCoeff') of two images is calculated in accordance with the following equation:

$$D = \sqrt{\sum_{i=0}^{Max\{Number\ Of\ YCoeff\}-1} \lambda_{Yi}(YCoeff[i] - YCoeff'[i])^2} \,+ \quad (1)$$
$$\sqrt{\sum_{i=0}^{Max\{Number\ Of\ YCCoeff\}-1} \lambda_{Cbi}(Cboeff[i] - YCboeff'[i])^2} \,+$$
$$\sqrt{\sum_{i=0}^{Max\{Number\ Of\ CCoeff\}-1} \lambda_{Cri}(CrCoeff[i] - CrCoeff'[i])^2}$$

In the above equation, $\lambda$ indicates weighting relating to each coefficient. Weighting values of the kind shown in Table 1 below are indicated in VXM 7.0. The cells in Table 1 that do not show a value have weighting values of 1.

TABLE 1

| | ORDER OF COEFFICIENTS | | | | | |
|---|---|---|---|---|---|---|
| | 1 | 2 | 3 | 4 | 5 | 6 |
| Y | 2 | 2 | 2 | 1 | 1 | 1 |
| Cb | 2 | 1 | 1 | | | |
| Cr | 4 | 2 | 2 | | | |

When a scaled image of an original image is produced at step S10201 in the above-described conventional method of extracting feature values, use is made of the mean value of the pixels within a block obtained by dividing the original image into vertical and horizontal numbers of pixels that are the target of scaling. As a consequence, information relating to the composition of the original image is unclear.

Furthermore, several coefficients are extracted from the low-frequency component side of quantized coefficients obtained by applying DCT processing to a scaled image, as described above. As a consequence, the smoothing effect on the original image as a total system becomes too extreme, thereby making the composition information of the original image even more obscure.

SUMMARY OF THE INVENTION

The present invention has been proposed to solve the problems of the prior art and a first object thereof is to produce a scaled image that represents well the features of the image that is to be scaled.

A second object of the present invention is to calculate a feature value (color layout descriptor) that represents well the color layout of an image.

According to the present invention, the first object is attained by providing an apparatus for generating a scaled image, comprising: image dividing means for dividing an image, which consists of a plurality of pixels, into a plurality of blocks by partitioning the image vertically and horizontally; color-space dividing means for dividing color space of the image into a plurality of subspaces; and color decision means for performing a histogram calculation, on a per-subspace basis, with regard to pixels constituting a block of interest among the plurality of blocks, and deciding a representative color of the block of interest in accordance with the average color of pixels belonging to a most frequent subspace among the plurality of subspaces as a result of the histogram calculation.

If the result of the histogram calculation is that two most frequent subspaces exist and that these subspaces are contiguous, then the color decision means decides the representative color of the block of interest in accordance with the average color of pixels belonging to these two subspaces.

In a preferred embodiment, the color decision means includes: arithmetic means for calculating a histogram, on a per-subspace basis, with regard to each pixel constituting the block of interest among the plurality of blocks; merge decision means which, if the result of the histogram calculation is that two most frequent subspaces exist and are not contiguous or that three or more most frequent subspaces exist, is for deciding whether a group of other contiguous subspaces can be merged with these subspaces to form a unified subspace; subspace merging means which, if the merge decision means has decided that merging is possible, is for merging the group of subspaces, thereby generating the unified subspace; and representative color decision means for recursively calculating a most frequent unified subspace by adding up frequencies of occurrence that are based upon the histogram calculations with regard to the unified subspace generated by the subspace merging means, and obtaining the average color of pixels that belong to this most frequent unified subspace and adopting this average color as the representative color of the block of interest.

In another preferred embodiment, the color decision means includes arithmetic means for performing a histogram calculation, on a per-subspace basis, with regard to pixels constituting a block of interest among the plurality of blocks; merge decision means which, if the result of the histogram calculation is that two most frequent subspaces exist and are not contiguous or that three or more most frequent subspaces exist, is for deciding whether a group of other contiguous subspaces can be merged with these subspaces to form a unified subspace; subspace merging means which, if the merge decision means has decided that merging is possible, is for merging the group of subspaces, thereby generating the unified subspace; and representative color decision means for recursively calculating a most frequent unified subspace by adding up frequencies of occurrence that are based upon the histogram calculations with regard to the unified subspace generated by the subspace merging means, and obtaining the average color of pixels that belong to this most frequent unified subspace (in an embodiment described below, this is an initial most frequent subspace (bin), or root subspace, that prevails prior to merging) and adopting this average color as the representative color of the block of interest.

According to another aspect of the present invention, the first object is attained by providing an apparatus for generating a scaled image, comprising: image dividing means for dividing an image, which consists of a plurality of pixels, into a plurality of blocks by partitioning the image vertically and horizontally; color-space dividing means for dividing color space of the image into a plurality of subspaces; arithmetic means for performing a histogram calculation, on a per-subspace basis, with regard to pixels constituting a block of interest among the plurality of blocks; and color decision means which, if the result of the histogram calculation by the arithmetic means is that a most frequent first subspace among the plurality of subspaces is one only and, moreover, that the difference between pixels belonging to this first subspace and pixels belonging to a next most frequent second subspace after the first subspace is greater than a predetermined first threshold value or this difference is greater than a predetermined second threshold value with respect to the overall number of pixels constituting the block of interest, is for deciding a representative color of the block of interest in accordance with the average color of pixels belonging to the first subspace.

According to still another aspect of the present invention, the first object is attained by providing an apparatus for generating a scaled image, comprising: image dividing means for dividing an image, which consists of a plurality of pixels, into a plurality of blocks by partitioning the image vertically and horizontally; color-space dividing means for dividing color space of the image into a plurality of subspaces; arithmetic means for performing a histogram calculation, on a per-subspace basis, with regard to pixels constituting a block of interest among the plurality of blocks; and color decision means which, if the result of the histogram calculation by the arithmetic means is that a most frequent first subspace among the plurality of subspaces is one only and, moreover, that the ratio or proportion between pixels belonging to this first subspace and pixels belonging to a next most frequent second subspace is greater than a predetermined first threshold value, is for deciding a representative color of the block of interest in accordance with the average color of pixels belonging to the first subspace.

According to the present invention, the second object is attained by providing an apparatus for calculating features of an image, comprising: the scaled image generating apparatus having any of the structures described above, and image feature calculation means for calculating a descriptor, which represents a color-layout feature of a scaled image, based upon the scaled image generated by the scaled image generating apparatus, and retaining at least the descriptor and the scaled image in an associated state.

In a preferred embodiment, the image feature calculation means includes: color-space transformation means for transforming the scaled image, which has been generated by the scaled image generating apparatus, to Y, Cb, Cr color space; arithmetic means for applying DCT processing to each component information in the Y, Cb, Cr color space acquired by the color-space transformation means, and applying quantization processing to DCT coefficients acquired as a result of the DCT processing; and coefficient selection means for selecting, as a descriptor representing a color-layout feature of the image, coefficients of a prescribed quantity from a low-frequency component side of the DCT coefficients, quantized for every component in the Y, Cb, Cr color space, acquired from the arithmetic means, and retaining at least the descriptor and scaled image in associated form.

Preferably, the apparatus further comprises similarity calculation means for calculating, based upon descriptors acquired by the coefficient selection means with regard to two original images, degree of similarity between these original images.

The foregoing objects are attained also by providing methods corresponding to the above-described scaled image generating apparatus an image feature calculation apparatus.

The foregoing objects are attained also by providing computer programs for instructing a computer to perform an operation that makes it possible to implement the above-described scaled image generating apparatus an image feature calculation apparatus and the corresponding methods, as well as a computer-readable storage medium in which these computer programs have been stored.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is a diagram exemplifying the scheme of a record within a search information database according to the first embodiment;

DESCRIPTION OF THE PREFERRED EMBODIMENTS

Preferred embodiments of the present invention will now be described in detail in accordance with the accompanying drawings.

Embodiments of an image search apparatus according to the present invention will be described in detail with reference to the drawings. Broadly speaking, in these embodiments, the image search apparatus has a function for registering images within the apparatus and a function for retrieving images, which are similar to a desired image that is the object of the search, from among the plurality of images that have been registered.

[First Embodiment]

Figure 8:
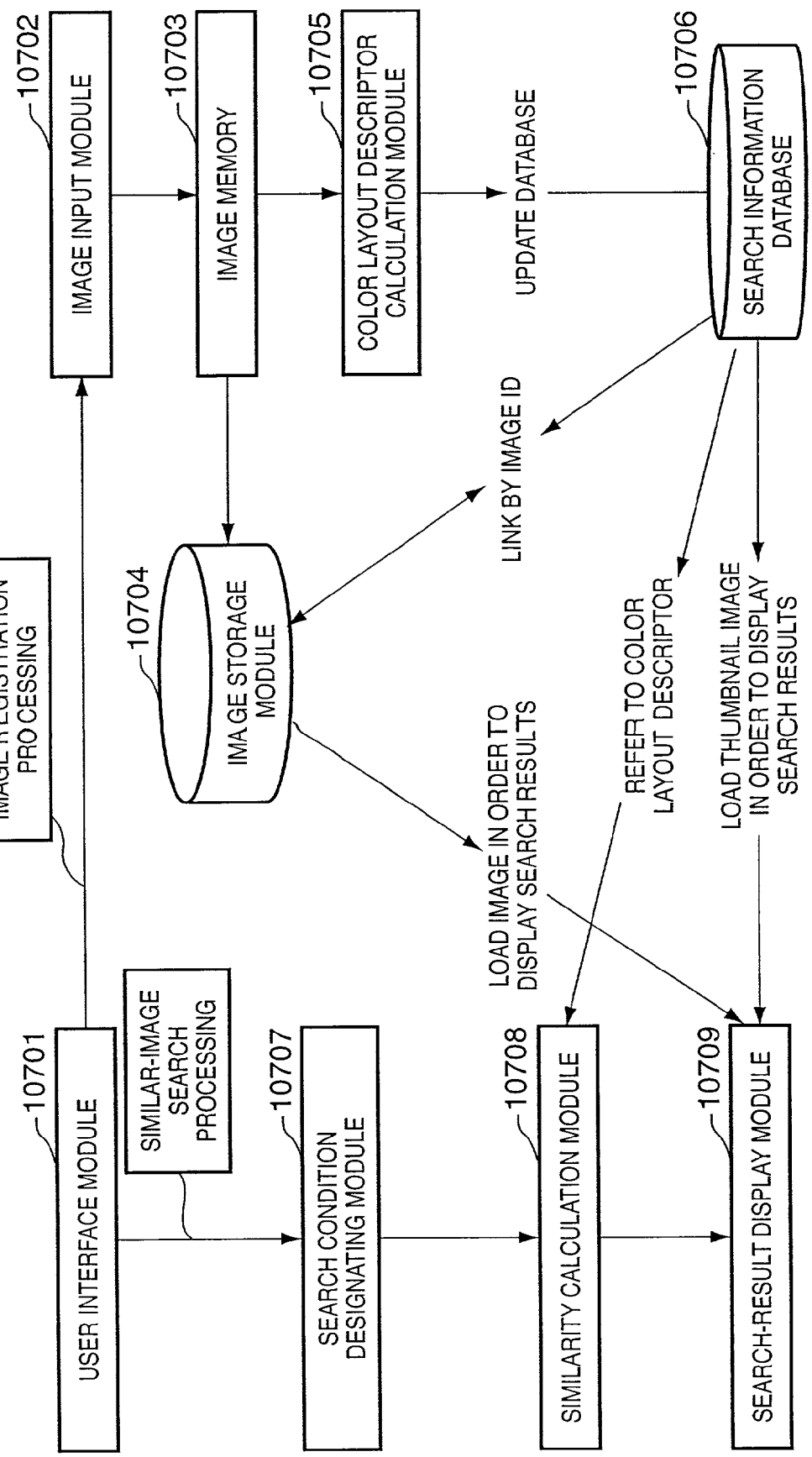
FIG. 8 is a block diagram illustrating the functional structure of an image search apparatus according to the first embodiment.

FIG. 8 is a block diagram illustrating the functional structure of the image search apparatus according to the first embodiment.

Figure 1:
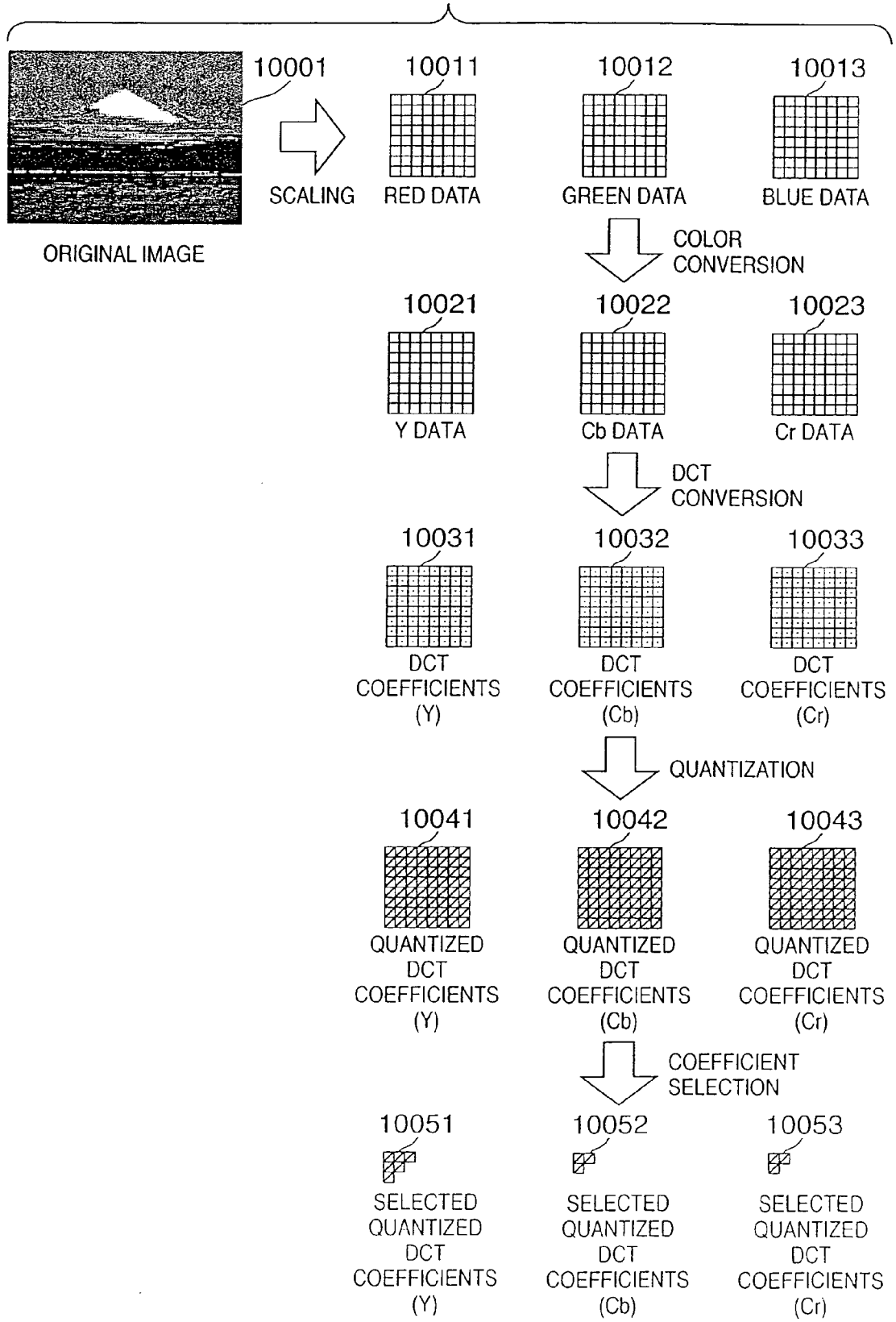
FIG. 1 is a diagram useful in describing the flow of processing for extracting color layout descriptors.

As shown in FIG. 1, the apparatus includes a user interface module 10701 that the operator can switch between image search processing and image registration processing; an image input module 10702 for capturing an image (e.g., image data compressed in accordance with the JPEG standard) via a scanner, digital camera or communication network; an image memory 10703 for storing an original image temporarily before executing calculation of color layout descriptors, described below; and an image storage module 10704 for storing a plurality of images, which have been entered via the image input module 10702, in a storage device such as a hard disk or on a portable storage medium.

The apparatus further includes a color layout descriptor calculation module 10705 for calculating color layout descriptors according to a characterizing feature of this embodiment; a search information database 10706 for storing calculated color layout descriptors, original-image address storage information and attribute information; a search condition designating module 10707 that enables the operator to designate images and the like to be searched when a search for similar images is conducted; a similarity calculation module 10708 for calculating degree of similarity; and a search-result display module 10709 for displaying search results on a display (not shown).

In this embodiment, a module indicates a certain function unit that the image search apparatus is capable of executing, and the embodiment assumes a case where modules are implemented by software alone or a case where modules are implemented by hardware and software.

The image search apparatus having the functional structure shown in FIG. 8 is implementable by a stand-alone information processing device such as a personal computer or by a system in which a plurality of information processing devices operate in concert via various communication lines in the manner of a client-server environment. The structure of such an information processing device can be of the ordinary type presently available and a detailed description thereof is omitted from the description of this embodiment.

The image search apparatus of this embodiment having the above-described functional structure is capable of executing image registration processing and image search processing. An overview of this processing will now be described.

Image Registration Processing

An image (original image) acquired by the image input module 10702 is stored in the image storage module 10704 and, in order to calculate the color layout descriptors(described later), is stored temporarily in the image memory 10703.

A color layout descriptor calculated by the color layout descriptor calculation module 10705 with regard to the image stored temporarily in the image memory 10703 is stored in the search information database 10706.

The color layout descriptor is associated (correlated) with the image, which has been stored in the image storage module 10704, with image identification information (referred to as an "image ID" below) issued uniquely in the image search apparatus.

Thumbnail images, which are for displaying search results, used in the search-result display module 10709 are stored in the search information database 10706. These thumbnail images are images obtained by well-known compression in accordance with, e.g., the JPEG (Joint Photographic Experts Group) standard.

Image Search Processing

With regard to an image of interest (an image that is the object of a search) that has been selected in the search information database 10706 by the operator for the purpose of retrieving similar images, the similarity calculation module 10708 calculates degrees of similarity D between this image of interest and all images that have been stored in the image storage module 10704 in order to detect images that are similar to this image.

A color layout descriptor of the image of interest and color layout descriptors that have been stored in the search information database 10706 are utilized in calculating degree of similarity D. The search-result display module 10709 displays the thumbnail images, which have been stored in the search information database 10706, in order of decreasing degree of similarity D calculated.

In addition to the above-mentioned data items, attribute information such as keywords and dates of photography may be stored in the search information database 10706. When an image search is conducted in such case, it will suffice to perform an AND operation between the attribute information and the similar-image based search, perform the similarity calculation using color layout descriptors only with regard to images to which the prescribed attribute has been appended, and display the similar images as thumbnail images in order of decreasing degree of similarity.

Image registration processing and image search processing will now be described in greater detail.

[Image Registration Processing]

Figure 9:
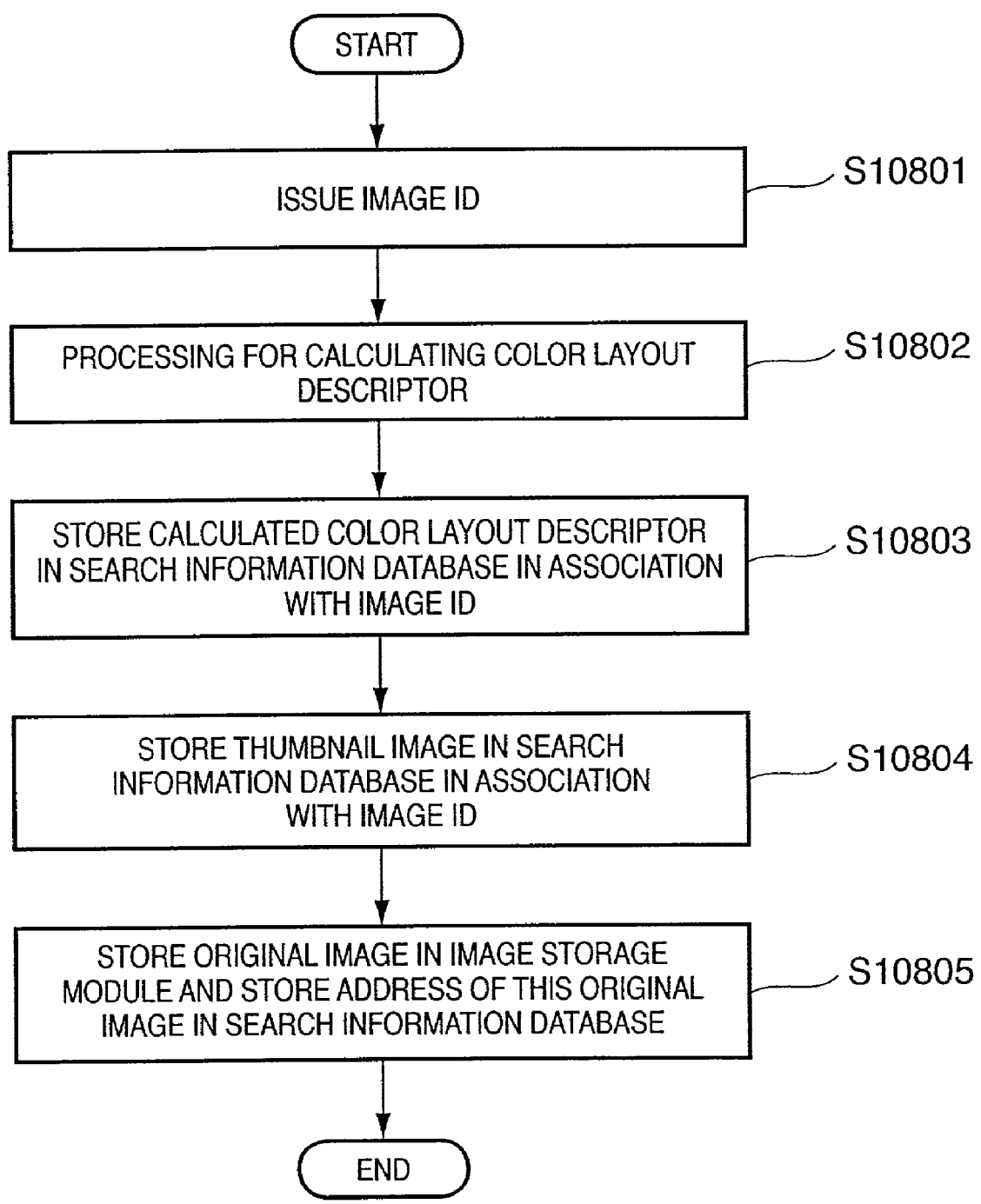
FIG. 9 is a flowchart illustrating image registration processing executed by the image search apparatus of the first embodiment.

FIG. 9 is a flowchart illustrating image registration processing executed by the image search apparatus of the first embodiment. This flowchart shows the processing procedure executed by a CPU (not shown) that runs software in which has been coded the operation of those modules relating to image registration among the modules depicted in FIG. 8.

In FIG. 9, an image that has been entered from the image input module 10702 as an image to be registered is stored temporarily in the image memory 10703, and an image ID is issued for this image (step S10801). It is required that the issued image ID be managed in such a manner that it will not be a duplicate of other image IDs in the image search apparatus.

The image for which the image ID has been issued is subjected to processing for extracting a color layout descriptor (step S10802). The details of this processing will be described later with reference to FIG. 11.

The image ID issued at step S10801 and the color layout descriptor calculated at step S10802 are stored in the search information database 10706 in associated (correlated) form (step S10803). Furthermore, this image ID and a thumbnail image (a scaled image produced at step S10802) of the image to be registered are stored in the search information database 10706 in associated (correlated) form (step S10804).

The image to be registered that has been stored temporarily in the image memory 10703 is stored in the image storage module 10704, and the storage address at which this image file has been stored is stored in the search information database 10706 (step S10805).

By virtue of the image registration processing described above, a record is stored in the search information database 10706 with the scheme exemplified in FIG. 12 with regard to the image to be registered.

It should be noted that the processing of step S10805 described above can be executed at any timing so long as it is after the issuance of the image ID at step S10801. Further, the processing of step S10804 also can be executed at any timing so long as it is after the issuance of the image ID at step S10801. Accordingly, the image registration processing of this embodiment is not limited to the flowchart shown in FIG. 9. However, the order in which the steps S10801 to S10803 are executed must not be changed.

<Processing for Extracting Color Layout Descriptor>

Processing for extracting a color layout descriptor that is a characterizing feature of this embodiment will now be described. When an image obtained by scaling the original image to be registered is produced, this processing for extracting a color layout descriptor is carried out in order to realize a scaled image that is faithful to the color layout of the original image.

Further, in this embodiment, the encoding of a JPEG-compressed image or MPEG (Moving Picture coding Experts Group)-1, MPEG-2, MPEG-4 frame is carried out in so-called Y, Cb, Cr color space. This is a state in which a color conversion has already been performed at the moment the code data is decoded.

Figure 11:
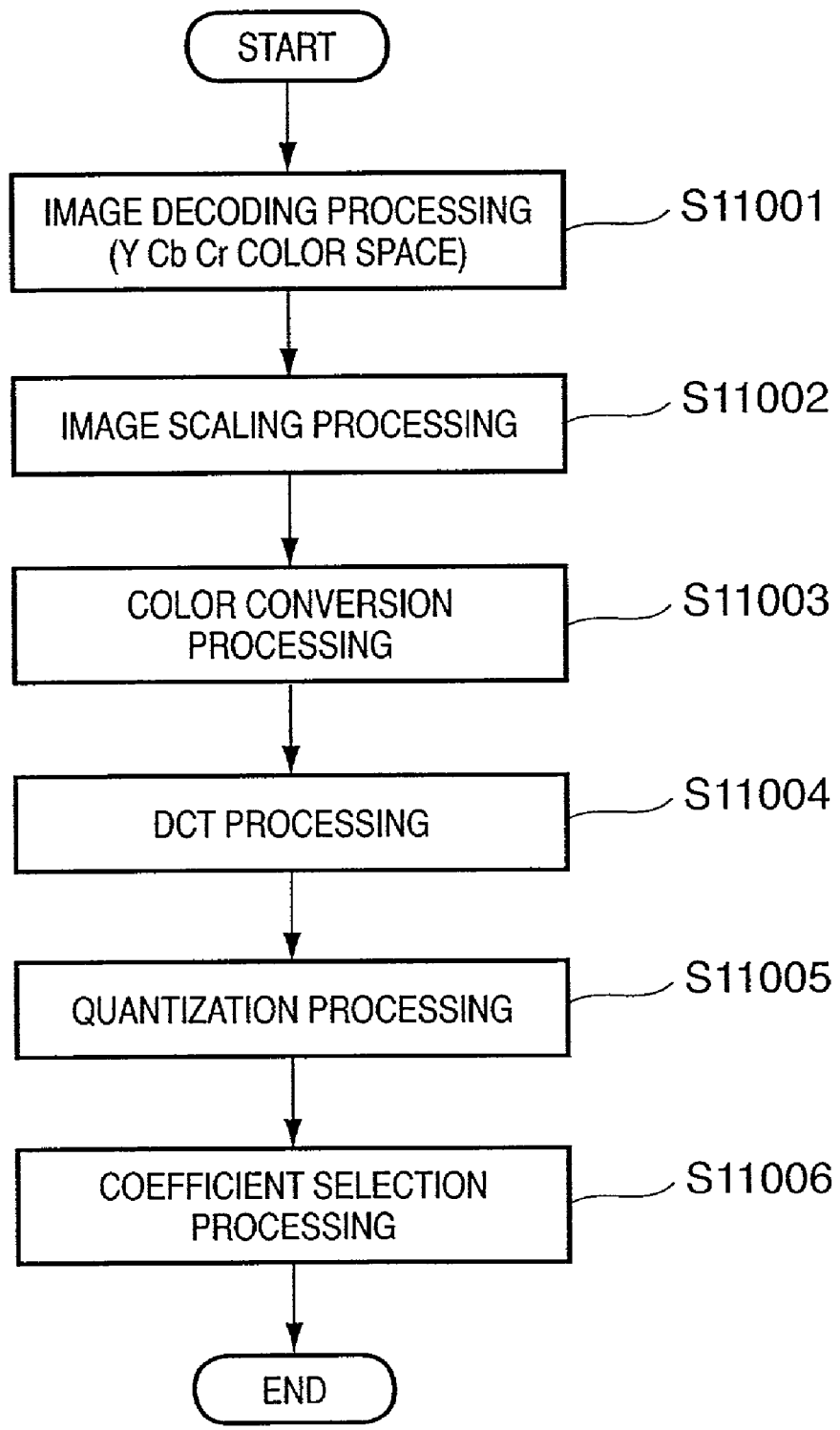
FIG. 11 is a flowchart illustrating processing for extracting color layout descriptors executed in the image registration processing of the first embodiment.

FIG. 11 is a flowchart illustrating processing for extracting a color layout descriptor executed in image registration processing according to the first embodiment.

In the flowchart of FIG. 11, the image (compressed according to the JPEG standard) to be registered is decoded by a well-known technique. Specifically, the JPEG-compressed image is decomposed into luminance information and color difference information in Y, Cb, Cr color space and these items of information are subjected to well-known DCT processing to thereby perform compressive encoding (step S11001). Accordingly, in this embodiment, information obtained immediately following inverse DCT processing is composed of Y, Cb, Cr luminance information and color difference information for each pixel. This is a state in which the Y, Cr, Cr color conversion has already been implemented.

In this embodiment, the thumbnail image of an original image to be registered is used in displaying the result of an image search conducted separately. In order that a thumbnail image of an original image to be registered may be stored in the search information database 10706 in advance, therefore, processing for scaling the image data that was acquired at step S11001 is executed (step S11002).

The scaling processing of step S11002 will now be described in detail.

With VWD 4.0 or VXM 7.0 described above in connection with the prior art, a scaled image is produced by calculating the average color of pixels contained in each block into which the original image has been divided. A problem which arises as a consequence is that information relating to the composition of the original image becomes unclear.

Figure 4:
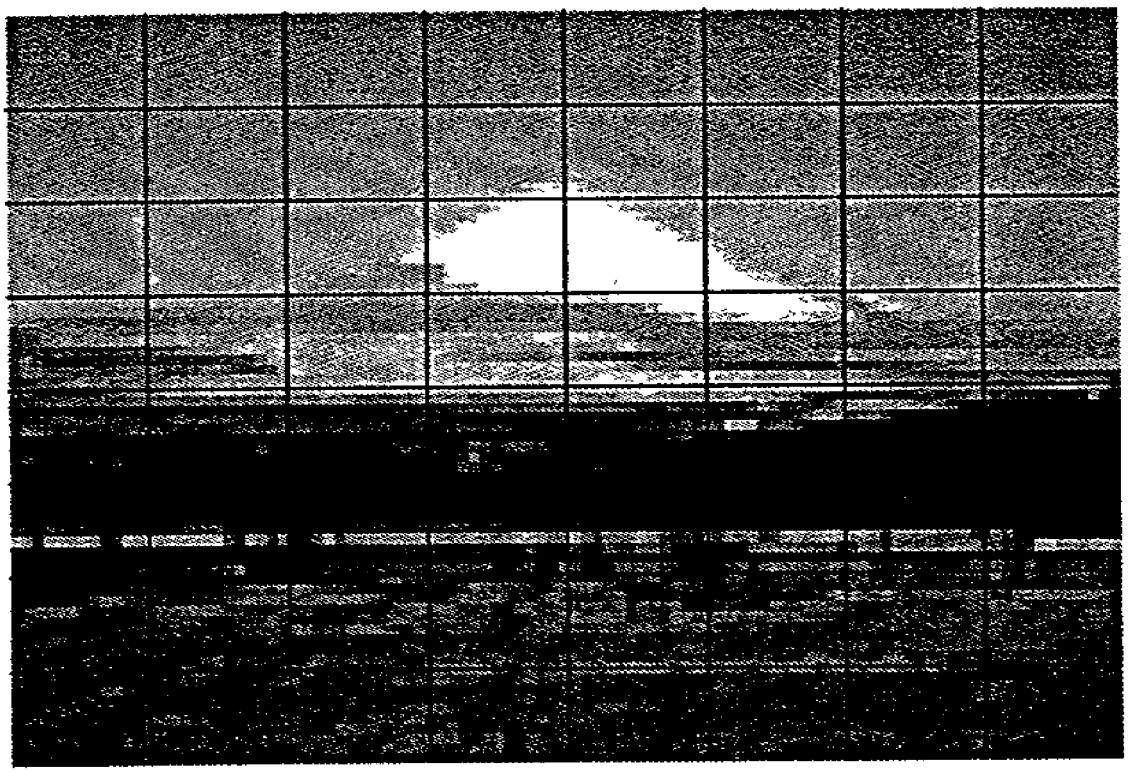
FIG. 4 is a diagram exemplifying an original image to be registered and the image in the divided state.

By contrast, in accordance with this embodiment, though the original image is divided into a total of 64 block images (referred to simply as "blocks" below) by being partitioned into eight blocks horizontally and eight blocks vertically, as shown in FIG. 4, which is the same as in the prior art, a scaled image of 8×8, or 64, pixels is generated by deciding a color that represents each block utilizing a method, described below, that is a procedure constituting a characterizing feature of this embodiment.

However, if a scaled image is generated based upon representative colors of respective ones of the blocks, as is done in this embodiment, there is the danger that a color that does not exist in the original image will appear. This problem becomes particularly conspicuous in a case where colors that are a great distance from each other in color space reside in the same block. For example, if a scaled image of the Japanese national flag is produced based upon average color, a pink color will result in relation to a block that straddles both the white background and red circle of the flag. The scaled image thus obtained will not be faithful to the color layout of the original image.

Accordingly, in this embodiment, each block is not represented by the average color of the pixels belonging to the block. Instead, processing is executed to find a color that represents the block better (i.e., more faithfully).

Figure 6:
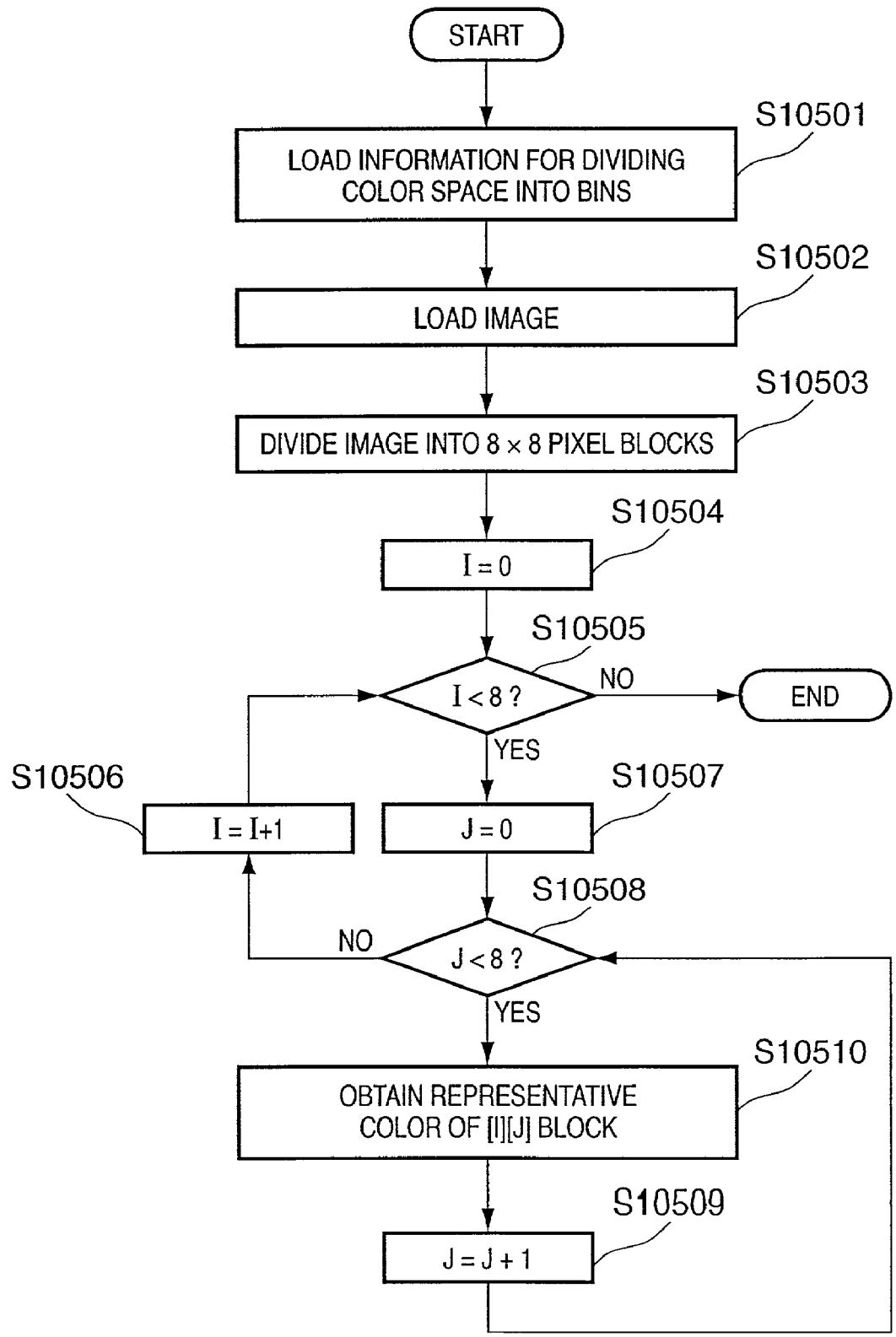
FIG. 6 is a flowchart illustrating processing for generating a scaled image in a first embodiment of the present invention.

FIG. 6 is a flowchart illustrating processing for generating a scaled image according to the first embodiment. This flowchart illustrates the details of the procedure of processing executed at step S11002 (FIG. 11) for the purpose of realizing a scaled image that is faithful to the color layout of an original image.

In FIG. 6, data for dividing Y, Cb, Cr color space into a plurality of subspaces (referred to as "bins" below) is loaded (step S10501).

Figure 5:
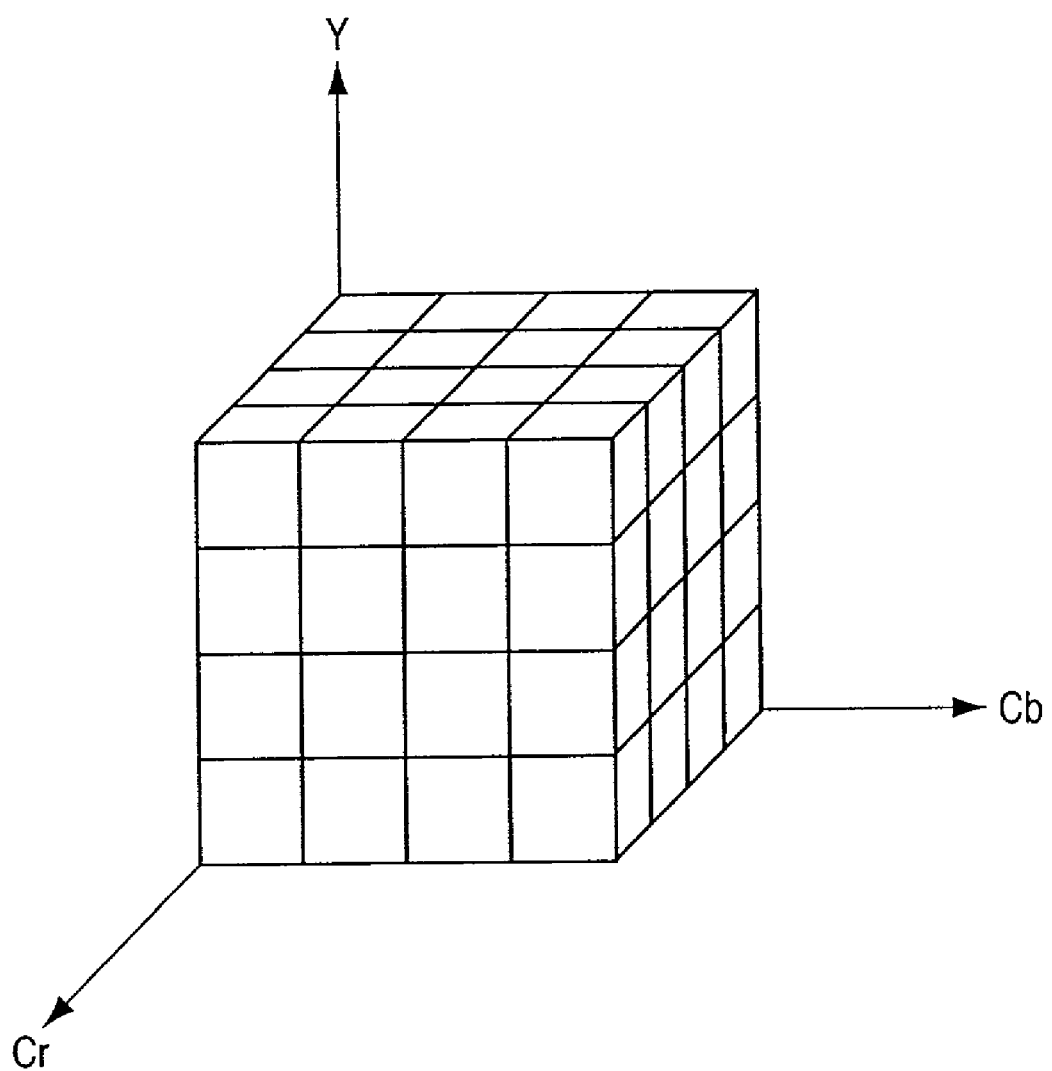
FIG. 5 is a conceptual view illustrating the relationship between Y, Cb, Cr color space and bins.

FIG. 5 is a conceptual view showing the relationship between Y, Cb, Cr color space and the bins mentioned above. This roughly decides colors regarded as identical and is used in order to produce classes for finding a color histogram.

Into which bins color space is to be divided should be determined by experimentation. If there is an approach that has been determined by VWD 4.0 or VXM 7.0, then the division of color space should be performed in accordance therewith.

Further, the form of the bins within the apparatus may be a LUT (Look-UP table) and mathematical expressions or logical expressions.

Further, the timing of data loading at step S10501 may be prior to histogram calculation; the timing is not particularly limited. Further, in a case where scaled images of a plurality of images are sought, the data loading at step S10501 need not be performed image by image; it will suffice to read in the data one time when the initial image is processed.

Next, the original image of interest for which the scaled image is sought is read in (step S10502), then the original image thus read in is divided into a total of 64 blocks by being partitioned into eight blocks vertically and eight blocks horizontally (step S10503), as exemplified in FIG. 4.

An original image of interest is classified broadly into three types, namely portrait (elongated vertically), landscape (elongated horizontally) and square. The size of each block should be decided in conformity with the number of blocks into which the original image is divided. In this embodiment, use is made of a landscape image of Mt. Fuji shown in FIG. 4. If the vertical or horizontal size of the original image is such that it cannot be divided evenly by eight, it will suffice to allocate the remaining pixels to some blocks, and a method of exceptional treatment based upon this fraction may be employed.

Next, at steps S10504 to S10510, to which bins of color space the pixels constituting each block apply are determined. Specifically, the representative color of each block is decided by histogram calculation. Steps S10504 to S10506 constitute loop processing with respect to a counter I, and steps S10507 to S10509 constitute loop processing with respect to a counter J. The representative color of each of the 8×8 pixel blocks is decided by this loop processing.

Processing (step S10510) for finding the representative color of each block will now be described in detail.

Figure 7:
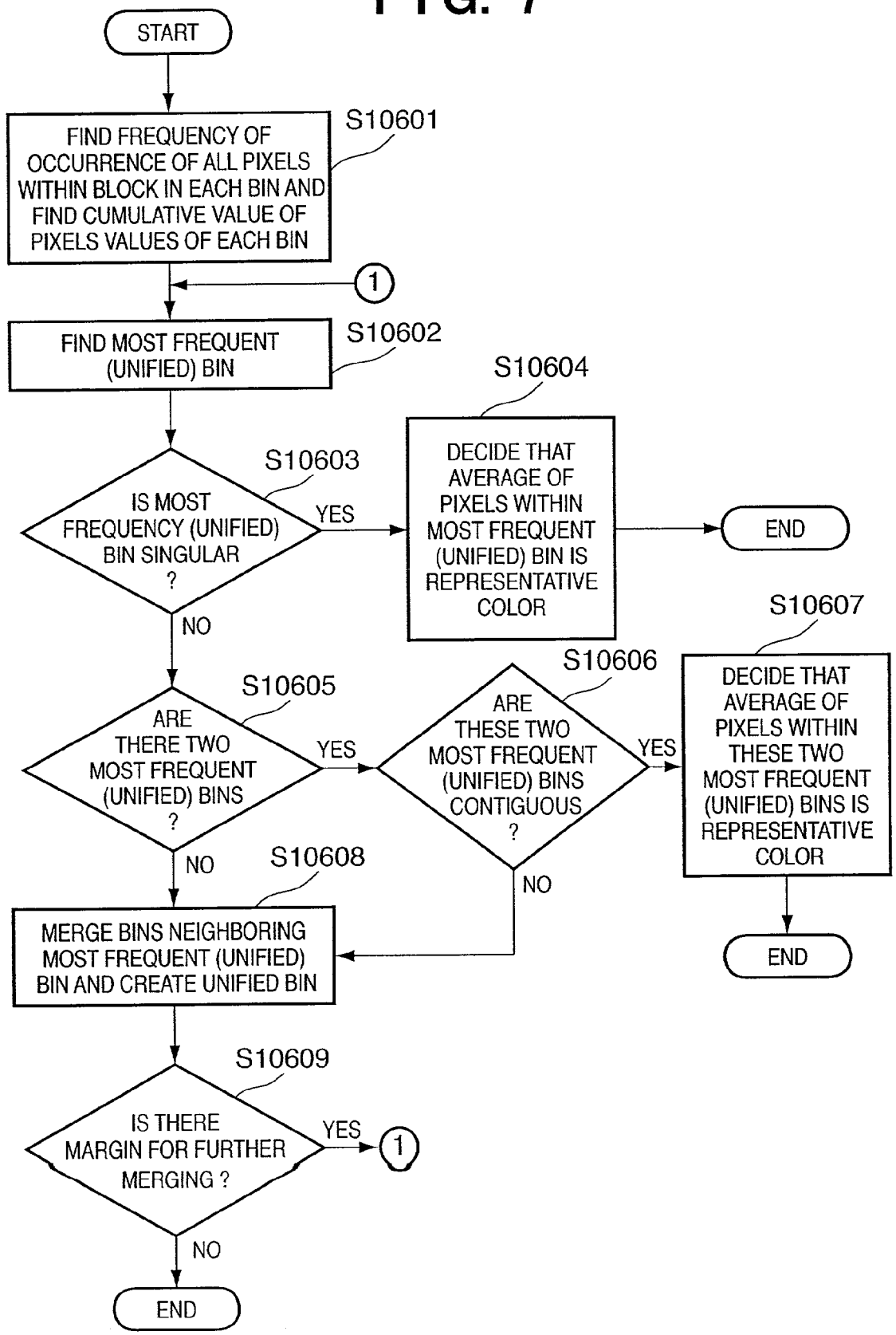
FIG. 7 is a flowchart illustrating processing for calculating a block representative color in the processing for generating a scaled image according to the first embodiment.

FIG. 7 is a flowchart illustrating processing for calculating a block representative color in the processing for generating a scaled image according to the first embodiment.

First, at steps S10601 and S10602 in FIG. 7, the bins in Y, Cb, Cr color space to which the pixels of each block obtained by dividing the original image are to be applied are obtained based upon the results of histogram calculation.

Specifically, with regard to all pixels within a block of interest in the present control cycle, the frequency of occurrence of these pixels in each bin constituting the Y, Cb, Cr color space, as shown in FIG. 5, and the cumulative value of the pixel values in each bin are found (step S10601). From the results obtained, the bin for which the frequency of occurrence is highest (this bin shall be referred to as the "most frequent bin") is decided (step S10602).

If the most frequent bin is determined to be singular ("YES" at step S10603), then the average color of the pixels belonging to this bin is found and this average color is adopted as the representative color of the block of interest (step S10604).

On the other hand, if there are two most frequent bins ("YES" at step S10605), then it is determined whether these two bins are contiguous in the Y, Cb, Cr color space (step S10606). If the result of the determination is that these two bins are contiguous ("YES" at step S10606), then the average color of the pixels belonging to these two contiguous bins is found and this average color is adopted as the representative color of the block of interest (step S10607).

Examples of methods of judging whether a plurality of bins are mutually contiguous are a method of storing identification information (ID) of bins that are contiguous to each particular bin, and a method of associating geometrical relationships in advance by equations using bin IDs. There is no particular limitation upon the method adopted.

If there are two most frequent bins and these two bins are not contiguous ("NO" at step S10606), then a group of another plurality of contiguous bins is merged with these two bin as a single bin (the bins merged shall be referred to as a "unified bin" below) and the frequencies of the merged plurality of bins are added as the frequency of the unified bin (step 10608).

To assure that processing will not lapse into an endless loop, a decision is rendered at step S10609 by checking whether bins to be merged no longer exist. When bin merging has been performed at step S10608 ("YES" at step S10609), the processing of steps S10603 to S10609 is executed recursively, whereby the most frequent unified bin can be obtained. The average color of the pixels belonging to this unified bin is found and this is adopted as the representative color of the block of interest.

Furthermore, if three or more most frequent bins exist ("NO" at step S10605), another group of contiguous bins is merged with these bins, whereby the frequencies are added (step S10608). The processing of steps S10603 to S10609 is executed recursively, whereby the most frequent unified bin can be obtained. The average color of the pixels belonging to this unified bin is found and this is adopted as the representative color of the block of interest.

The recursive processing mentioned above includes searching for a bin contiguous to each most frequent bin and, if this bin and the most frequent bin are contiguous, merging these two bins to obtain a single most frequency unified bin (step S10608).

Accordingly, if all of the most frequent bins are contiguous, then the end result is that one unified bin is obtained ("YES" at step S10603), and therefore the average color of the pixels belonging to the unified bin obtained is found and this average color is adopted as the representative color of the block of interest (step S10604).

On the other hand, if all of the most frequent bins are not contiguous, then the bin merging processing (step S10608) and the processing for obtaining the most frequent unified bin (step S10602) is executed recursively until the most frequent unified bin becomes one ("YES" at step S10603) or until two most frequent bins become contiguous ("YES" at step S10606). At step S10604, the average color of pixels belonging to the most frequent unified bin obtained is found and this average color is adopted as the representative color of the block of interest.

If the end result is that a most frequent bin is not determined ("NO" at step S10609), the average color of the pixels in the entire block is found and this average color is adopted as the representative color of the block of interest.

In the above description, when a representative color is decided in a case where there are two most frequent bins and these two bins are not contiguous, a unified bin that to serve as the most frequent bin is obtained and the mean value of the pixels belonging to this unified bin is adopted as the representative color of the block of interest. However, as the result of experiments conducted by the applicant, it has been found that excellent results are obtained even if the mean value of pixels belonging to the initial most frequent bin that prevailed prior to unification processing, namely the root bin, is adopted as the representative color of the block of interest. This method may also be used to decide the representative color of a block.

The above-described processing is executed for all 64 of the blocks, thereby making it possible to generate a scaled image that remains faithful to the color layout of the original image.

It should be noted that a conceivable method of generating a scaled image is to calculate a histogram in color space obtained by transformation and then generating the scaled image after color transformation processing. To cite an example, compressive encoding in the usual case is carried out after the transformation of color space. In actuality, regardless of whether an image is a JPEG image or a frame image in an MPEG movie, image compression is such that DCT is performed in Y, Cb, Cr color space. Values in Y, Cb, Cr color space are obtained by performing inverse DCT in order to effect decoding, and these values are converted to values in RGB color space, whereby colors that are natural to the human eye are displayed.

With reference again to FIG. 11, the processing of each step up to selection of coefficients is similar to the conventional procedure described above with reference to FIG. 1. Accordingly, this processing will be described while referring to the reference numerals of FIG. 1.

Each of the pixels constituting the generated block images (10011, 10012, 10013) of 8×8 pixels each are converted to data (10021, 10022, 10023) in Y, Cb, Cr color space at step S10203.

The data 10021, 10022, 10023 representing the components in Y, Cb, Cr color space is subjected to DCT processing at step S11004, whereby DCT coefficients 10031, 10032, 10033 are obtained.

The DCT coefficients 10031, 10032, 10033 are subjected to quantization processing at step S11005. In accordance with VWD 4.0, for example, this quantization processing for DC components differs from that for AC components with regard to the Y component and Cb/Cr components.

Next, several coefficients are selected from the side of low-frequency components among the quantized DCT coefficients 10041, 10042, 10043 at step S11006. In the example of FIG. 1, six coefficients (10051) have been selected with regard to the coefficients of the Y component, and three coefficients each (10052, 10053) have been selected with regard to the coefficients of the Cb/Cr components.

Figure 2:
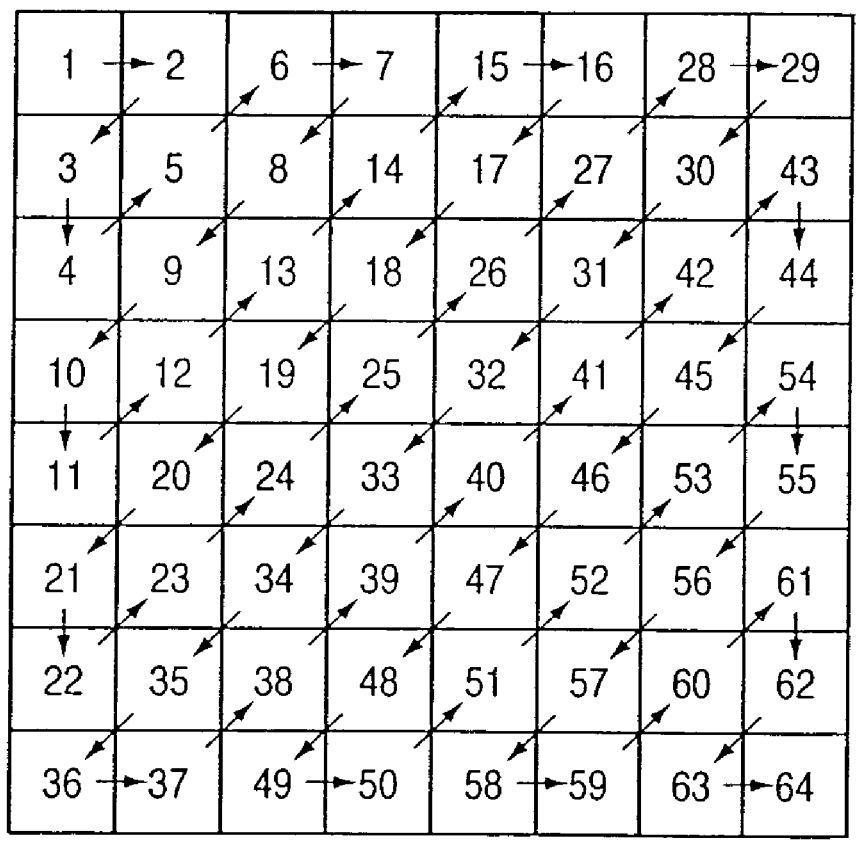
FIG. 2 is a diagram useful in describing zigzag-scan processing for selecting coefficients.
Figure 3:
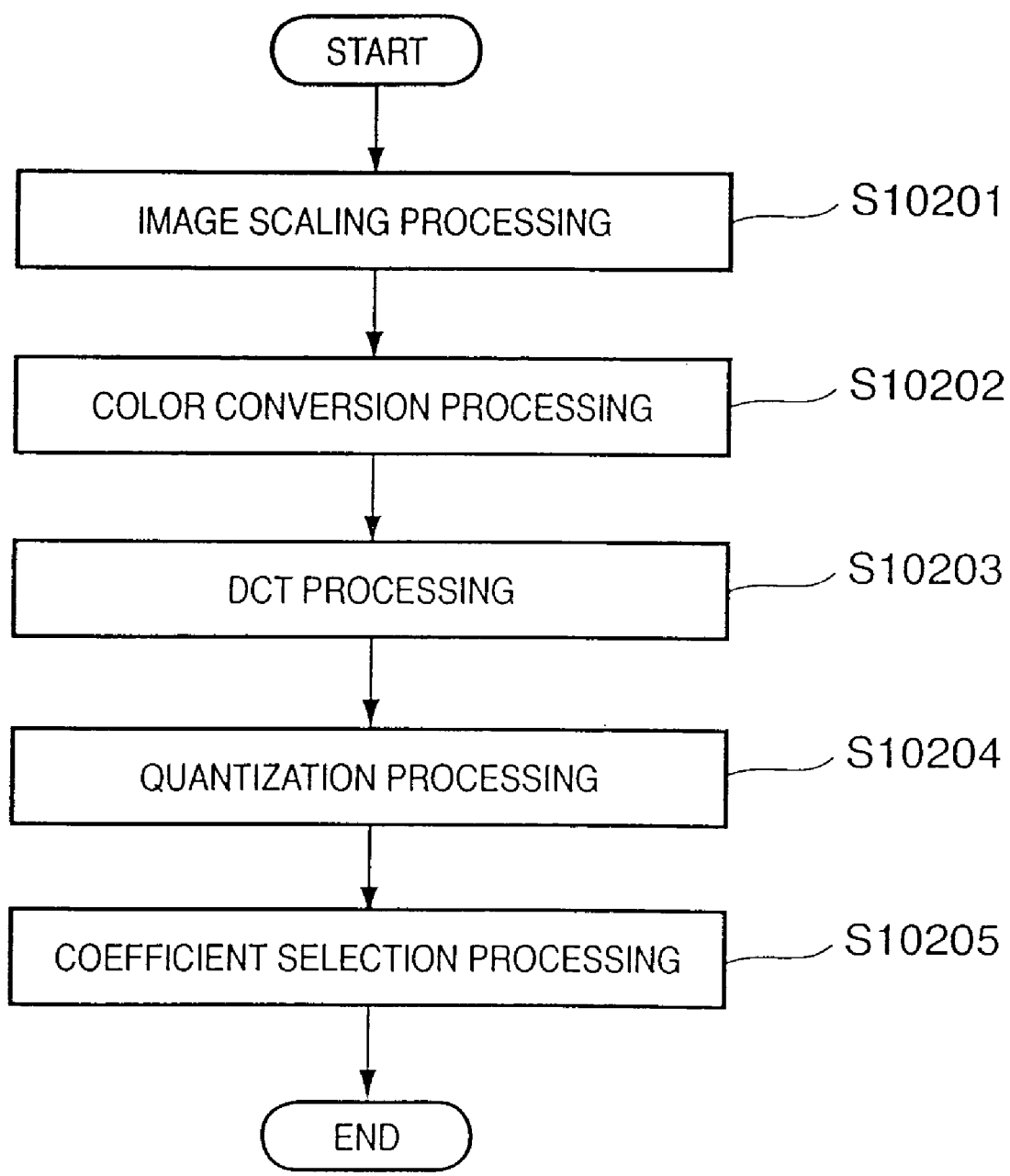
FIG. 3 is a flowchart illustrating processing for extracting color layout descriptors according to the prior art.

As exemplified in FIG. 2, the selection of coefficients at step S11006 is achieved by rearranging the coefficients, which are arrayed two-dimensionally as indicated by the 8×8 pixel configuration, into a one-dimensional array by zigzag scanning, and selecting several coefficients starting from the leading coefficient. The numerals 1 to 64 written in the blocks of FIG. 2 indicate which numbers the coefficients will come to occupy starting from the leading coefficient after the coefficients have been rearranged one-dimensionally. The selected coefficients are extracted in order from the side of the low-frequency components. In accordance with VWD 4.0, the number of coefficients that should be selected in the coefficient selection process is any of 1, 3, 6, 10, 15, 21, 28 and 64.

Though the numbers of coefficients are the same for the Cb-component coefficients and Cr-component coefficients, it is possible for the number of Y-component coefficients to be set to a number different from that of the Cb/Cr-component coefficients. With VWD 4.0, the default selection is six coefficients with regard to the Y-component coefficients and three coefficients for each of the Cb/Cr-component coefficients. VWD 4.0 adopts a color layout descriptor value representing the features of color layout of the original image 1001 using the selected coefficients 10051, 10052, 10053.

The color layout descriptor thus calculated is stored in the search information database 10706 in a form associated with the image ID, as exemplified in FIG. 12.

FIG. 12 is a diagram exemplifying the scheme of a record within a search information database according to the first embodiment.

As shown in FIG. 12, an image identification number (ID), the storage address of this image file, the thumbnail image (scaled image) data, the color layout descriptor and other image attribute information are stored in the search information database 10706 in relation to each original image. By thus storing these data items in the associated state, image search processing (FIG. 10), described below, can be executed efficiently. In other words, a convenient and easy-to-use image search can be conducted utilizing color layout descriptors that are indices representing the features of color layout.

It should be noted that if a thumbnail image is merely to be retrieved and displayed utilizing a color layout descriptor, it will suffice to adopt a data structure in which at least the thumbnail image (scaled image) of an original image and the color layout descriptor of this original image are associated with each other.

Thus, this embodiment is such that when a scaled image of an original image is generated, a histogram of the pixels within a block of interest is calculated with the bins in color space serving as a reference, and the color of the block is decided in accordance with the mean value of the pixels that belong to the most frequent bin. As a result, the features of the original image can be expressed efficiently and a scaled image that is faithful to the color layout of the original image can be generated. Furthermore, it is possible to generate a color layout descriptor in which the image-composition information of the original image is maintained.

In the description rendered above, it is explained that when a representative color is decided in a case where two most frequent bins exist and these two bins are not contiguous, a unified bin to serve as the most frequent bin is obtained and the mean value of the pixels belonging to the unified bin is adopted as the representative color of the block of interest. However, as the result of experiments conducted by the applicant, it has been found that excellent results are obtained even if the mean value of pixels belonging to the initial most frequent bin that prevailed prior to unification processing, namely the root bin, is adopted as the representative color of the block of interest.

[Image Search Processing]

Image search processing in the image search apparatus of this embodiment will now be described.

Figure 10:
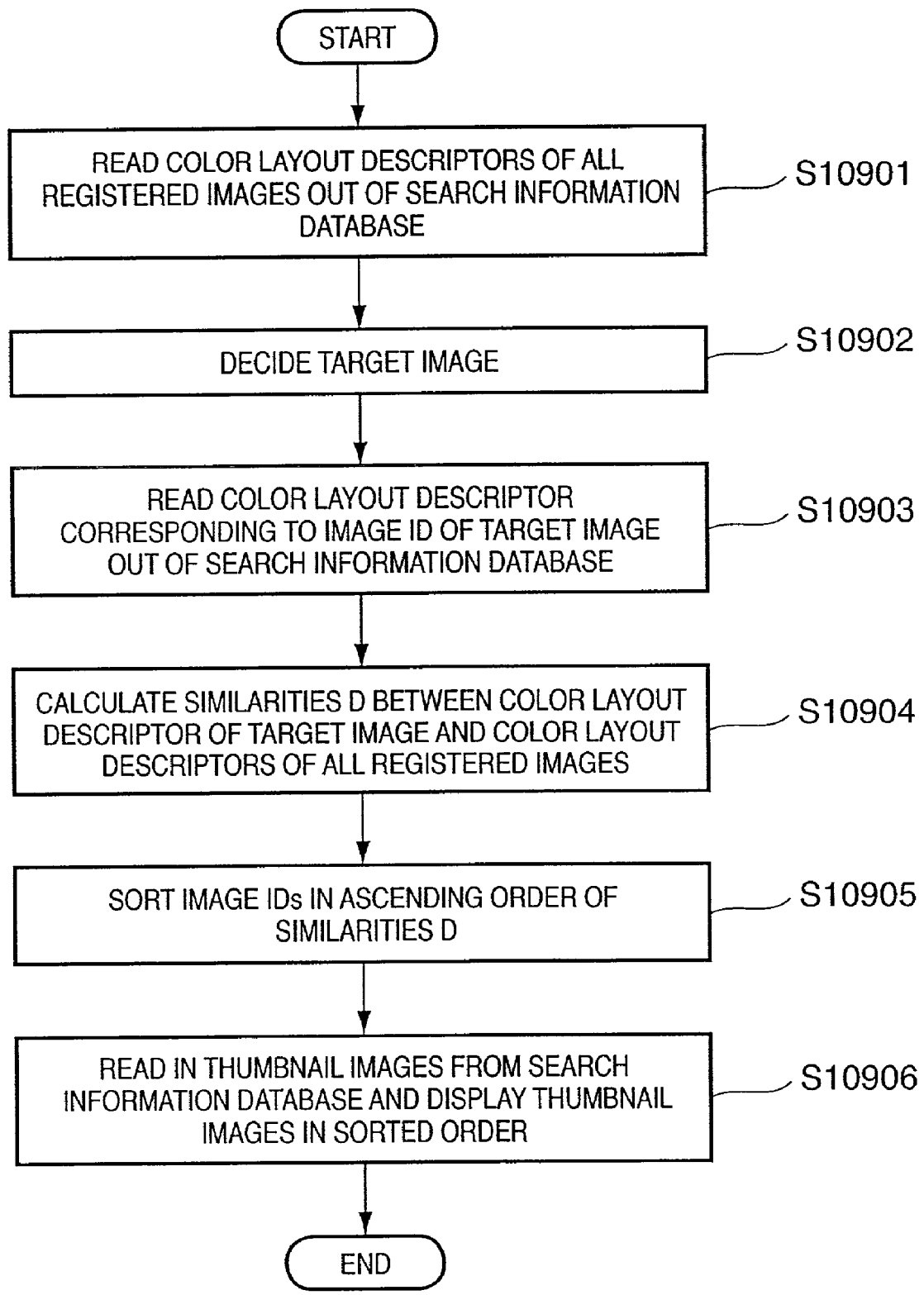
FIG. 10 is a flowchart illustrating image registration processing executed by the image search apparatus of the first embodiment.

FIG. 10 is a flowchart illustrating image registration processing executed by the image search apparatus according to the first embodiment. This flowchart shows the processing procedure executed by a CPU (not shown) that runs software in which has been coded the operation of those modules relating to image search among the modules depicted in FIG. 8.

Original images (referred to also as "registered images" below) are stored in the image storage module 10704 beforehand by the above-described image registration processing. In image search processing, it is required that color layout descriptors of all of these registered image be made available in the search information database 10706.

First, at step S10901 in FIG. 10, the color layout descriptors of all registered images are read into memory from the search information database 10706 in accordance with the image search mode selected by the operator using the user interface module 10701.

Here it will suffice to adopt an arrangement in which the reading of the color layout descriptors is not carried out whenever an image search is conducted but one time only when the search is first conducted or when the system is started up.

The image (referred to as the "target image" below) selected by the operator in the search information database 10706 is set as an original image for the purpose of retrieving similar images (step S10902). An example of a method of selecting an image at this step is to display a plurality of thumbnail images on a display in the form of randomly arrayed tiles and then select the desired thumbnail image from these thumbnail images. In such a case, it will suffice to generate random numbers as image IDs, read the thumbnail images conforming to the corresponding image IDs out of the search information database 10706 and display these thumbnail images on the display.

With the image ID that corresponds to the image selected by the operator serving as a key, the color layout descriptor associated with this image ID is extracted from the search information database 10706 (step S10903).

The degree of similarity D is calculated in accordance with the above-cited Equation (1) utilizing the target-image color layout descriptor acquired at step S10903 and the color layout descriptors of all registered image read in at step S10901 (step S10904). For example, if the color layout descriptors of two images are CLD1 (YCoeff, CbCoeff, CrCoeff) and (YCoeff', CbCoeff', CrCoeff'), then the degree of similarity D between these two descriptors can be calculated in accordance with Equation (1) in compliance with the VXM 7.0 standard. In Equation (1), $\lambda$ indicates weighting relating to each coefficient. Weighting values of the kind shown in Table 1 above are indicated in VXM 7.0. The cells in Table 1 that do not show a value have weighting values of 1.

Image IDs are sorted in ascending order (i.e., in order of increasing degree of similarity), for example, in accordance with the degrees of similarity calculated at step S10904 (step S10905), and the thumbnail images corresponding to these sorted image IDs are read in from the search information database 10706 and displayed on a display (not shown) (step S10906). The reason for sorting in ascending order is as follows: as indicated by Equation (1), the closer the resemblance between images, the more the value approaches zero, while the smaller the resemblance between images, the greater the value becomes.

In accordance with the image search processing described above, thumbnail images resembling the target image designated by the operator can be displayed in list form in order of decreasing degree of similarity. If the operator finds a favorable thumbnail image among the list thereof, then the operator selects this desired thumbnail image via the user interface module 10701. Using the image ID of the thumbnail image selected by the operator as a key, the search-result display module 10709 refers to the search information database 10706 to acquire the corresponding storage address information, reads the image data, which has been stored in the image storage module 10704, in accordance with the acquired storage address information and displays the image on the display.

[Second Embodiment]

A second embodiment which has the image search apparatus of the first embodiment as its base will now be described. In the description that follows, components similar to those of the first embodiment will not be described in order to avoid prolixity, and the description will focus on the portions constituting the characterizing feature of this embodiment.

In this embodiment, processing (step S10510) for obtaining a representative color for each block obtained by dividing the original image is implemented through a procedure that differs from that of the processing (FIG. 7) for calculating block representative colors in the processing for generating a scaled image according to the first embodiment.

Figure 13:
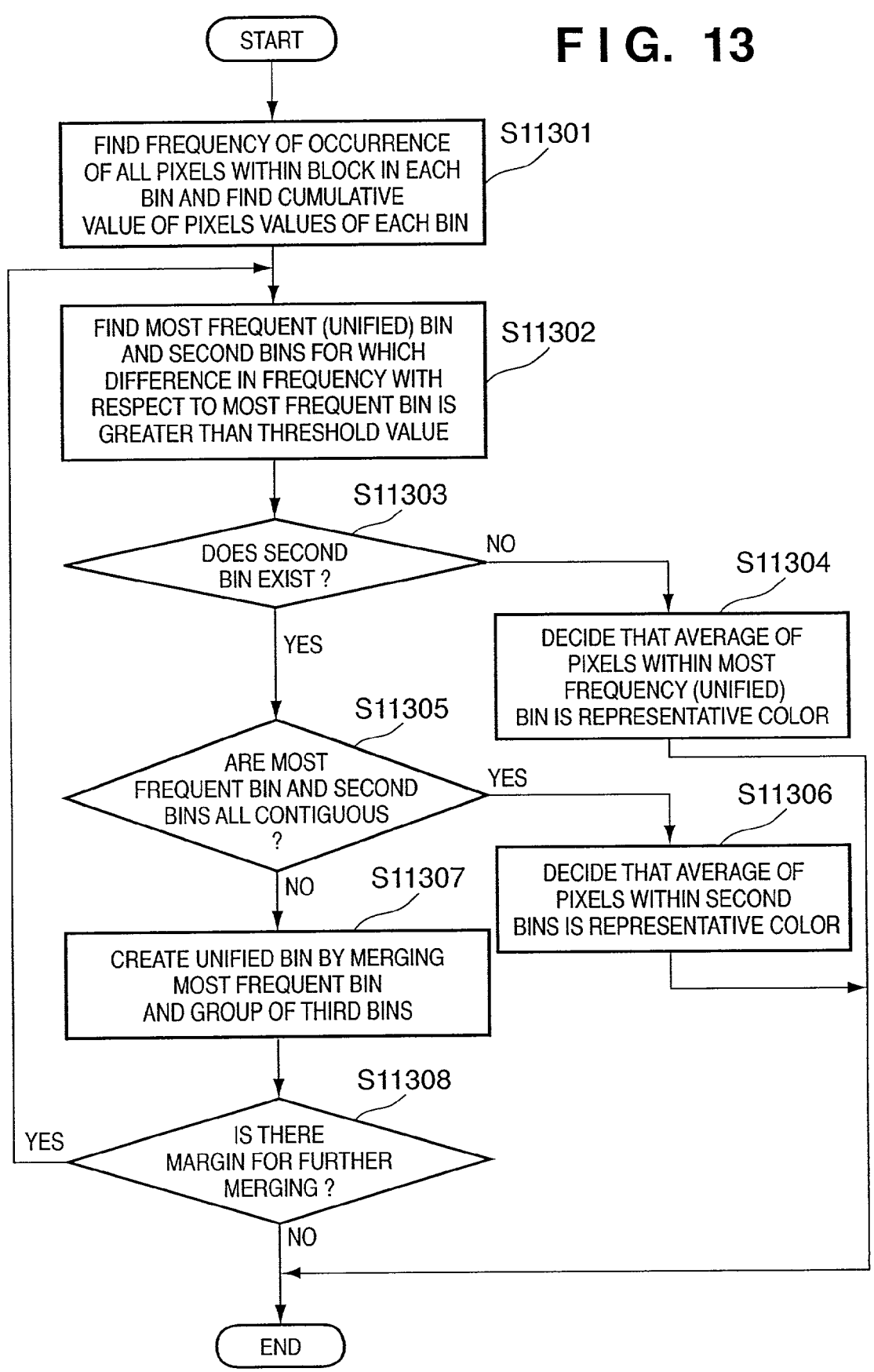
FIG. 13 is a flowchart illustrating processing for calculating a block representative color in processing for generating a scaled image according to a second embodiment of the present invention.

FIG. 13 is a flowchart illustrating processing for calculating a block representative color in processing for generating a scaled image according to the second embodiment. This processing is applied to each block in this embodiment as well.

First, with regard to all pixels within a block of interest in the present control cycle, to which bins in Y, Cb, Cr color space the pixels of this block belong are found based upon the result of histogram calculation (step S11301). That is, with regard to all pixels constituting the block of interest, a histogram calculation is performed to obtain the frequency of occurrence of these pixels in each bin constituting the Y, Cb, Cr color space, as shown in FIG. 5, and the cumulative value of the pixel values in each bin.

Next, by utilizing the results of the histogram calculation, the system finds the most frequent bin (the bin for which the frequency of occurrence is highest, just as in the case of FIG. 7) and a bin (referred to as the "second bin" below) whose difference in frequency with respect to the most frequent bin is greater than a predetermined value (step S11302). Here the second bin is the next most frequent bin after the most frequent bin.

If such a second bin does not exist ("NO" at step S11303) (i.e., if the most frequent bin is one only and the second bin is non-existent), then the system obtains the average color of the pixels belonging to the most frequent bin found at step S11302 and adopts this average color as the representative color of the block of interest (step S11304).

If a "YES" decision is rendered at step S11303, on the other hand, control proceeds to step S11305. More specifically, if it is judged at step S11303 that the most frequent bin and second bins exist, it is determined at step S11305 whether the most frequent bin and the second bins are all contiguous in Y, Cb, Cr color space.

If a "YES" decision is rendered at step S11305 (i.e., if the most frequent bin and the second bins are contiguous), the system finds the average color of the pixels belonging to the second bins and adopts this average color as the representative color of the block of interest (step S11306).

On the other hand, if a "NO" decision is rendered at step S11305 (i.e., if there are a plurality of most frequent bins or if the most frequent bin and the second bins are not all contiguous), then a group of another plurality of contiguous bins (third bins) contiguous with these bins is set as unified bin (i.e., as a plurality of bins merged as a single bin, just as in the case of the FIG. 7) and the frequencies of these merged plurality of bins are added to give the frequency of the unified bin (step S11307).

Examples of methods of judging whether a plurality of bins are mutually contiguous are a method of storing identification information (ID) of bins that are contiguous to each particular bin, and a method of associating geometrical relationships in advance by equations using bin IDs. There is no particular limitation upon the method adopted.

To assure that processing will not lapse into an endless loop, a decision is rendered at step S11308 by checking whether bins to be unified no longer exist. When bin unification has been performed at step S11307 ("YES" at step S11308), the processing of steps S11303 to S11308 is executed recursively, whereby the most frequent unified bin can be obtained. The average color of the pixels belonging to this unified bin is found and this is adopted as the representative color of the block of interest.

The recursive processing mentioned above includes adopting each most frequent bin as a reference at step S11305 and searching for a bin (third bin) that is contiguous to these most frequent bins and second bins.

If a "YES" decision is rendered at step S11305, a single unified bin is eventually obtained and therefore the average color of the pixels belonging to the unified bin obtained is found and this average color is adopted as the representative color of the block of interest (step S11304).

On the other hand, if a "NO" decision is rendered at step S11305, this means that a group of the aforementioned third bins exists. Accordingly, the unification processing (step S11307) for obtaining a single unified bin by merging the most frequent bin and third bins and the processing (step S11302) for obtaining the most frequent unified bin is executed recursively until the most frequent bin becomes a single bin and a bin whose difference in frequency with respect to the frequency of the most frequent unified bin is less than the threshold value no longer exists ("NO" at step S11303) or until the most frequent bin and third bins are all contiguous ("YES" at step S11305). At step S11304, the average color of pixels belonging to the most frequent unified bin obtained is found and this average color is adopted as the representative color of the block of interest.

It should be noted that if, finally, a most frequent bin is not the sole bin or a bin for which the difference in frequency with respect to the most frequent merged bin is less than the threshold value exists ("NO" at step S11308), the average color of the pixels in the entire block is found and this average color is adopted as the representative color of the block of interest.

Further, the embodiment described above is such that if a "NO" decision is rendered at step S11305, a unified bin that is the sole unified bin and for which the frequency of occurrence is highest is found and the mean value of pixels belonging to this unified bin is adopted as the representative color of the block of interest. However, as the result of experiments conducted by the applicant, it has been found that excellent results are obtained even if the mean value of pixels belonging to the initial most frequent bin that prevailed prior to unification processing, namely the root bin, is adopted as the representative color of the block of interest. This method may also be used to decide the representative color of a block.

With regard to the threshold value used in judging the frequency difference with respect to the most frequent bin in recursive processing, the value may be changed from the threshold value of the initial cycle of processing. For example, by making this threshold value "1" in recursive processing, it is possible to render a simple size-comparison judgement.

Further, the size of the threshold value used in judging the frequency difference with respect to the most frequent bin may be changed in accordance with the number of times recursive processing is executed. For example, if the threshold value is reduced when the number of recursive cycles increases, it possible to deal with a case where the frequency difference does not increase owing to a decrease in bins merged.

By applying the above-described processing to all 64 blocks, it is possible to generate a scaled image that remains faithful to the color layout of the original image, just as in the first embodiment.

[Third Embodiment]

A third embodiment which has the image search apparatus of the first and second embodiments as its base will now be described. In the description that follows, components similar to those of the first embodiment will not be described in order to avoid prolixity, and the description will focus on the portions constituting the characterizing feature of this embodiment.

In this embodiment, processing (step S10510) for obtaining a representative color for each block is implemented by still a different method, with the processing procedure described in the second embodiment serving as the basis.

Figure 14:
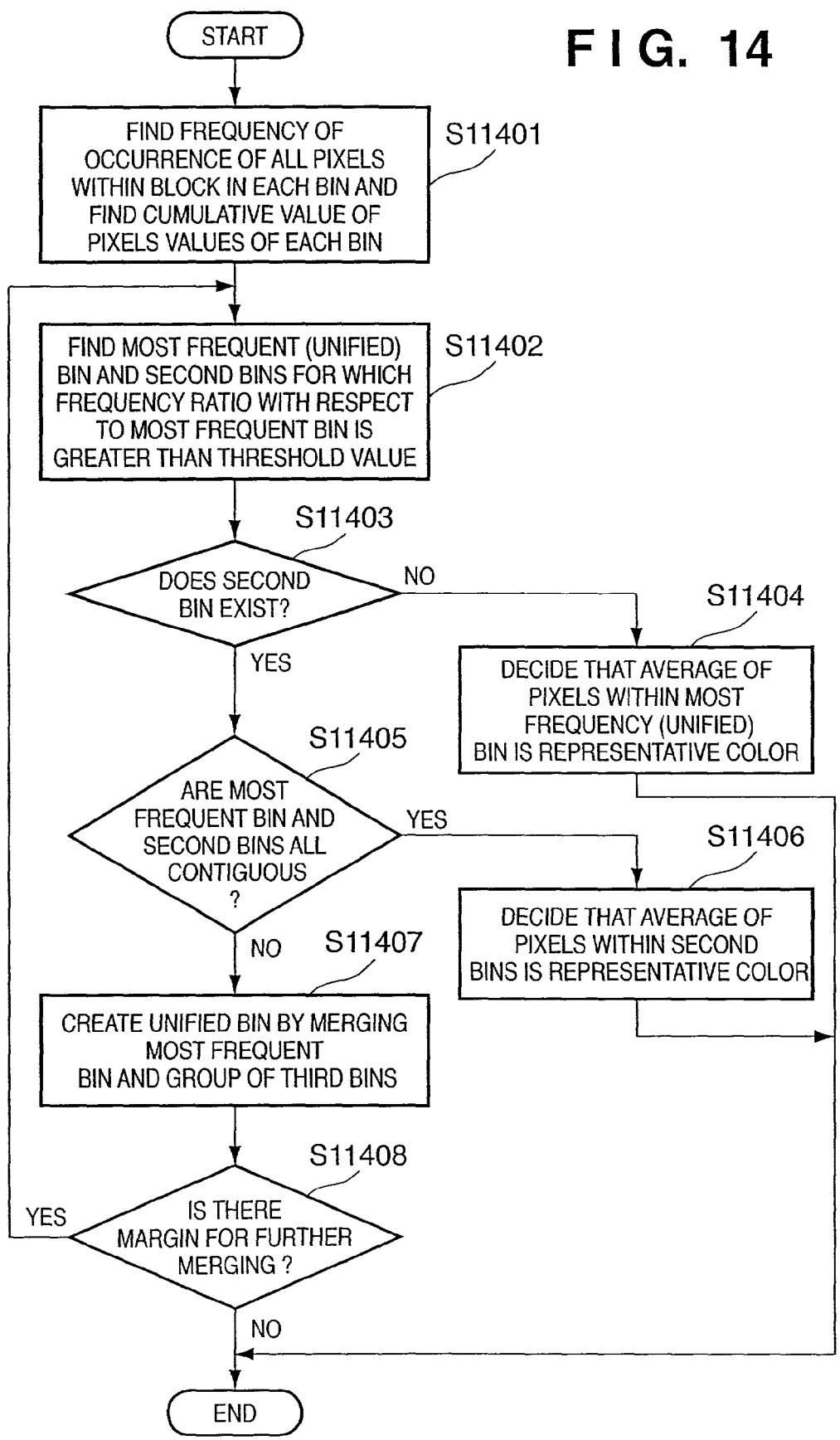
FIG. 14 is a flowchart illustrating processing for calculating a block representative color in processing for generating a scaled image according to a third embodiment of the present invention.

FIG. 14 is a flowchart illustrating processing for calculating a block representative color in processing for generating a scaled image according to the third embodiment.

Unlike the second embodiment (FIG. 13), in which a bin whose difference in frequency with respect to the most frequent bin is greater than a predetermined value is adopted as the "second bin", the third embodiment adopts a bin whose "frequency ratio" (or "frequency proportion") with respect to the most frequent bin is greater than a predetermined value is adopted as the "second bin", as shown in FIG. 14. Since the procedure of this processing is similar to that of FIG. 13, a detailed description thereof is omitted.

As in the first embodiment, this embodiment also makes it possible to generate a scaled image that remains faithful to the color layout of the original image.

<Modifications>

In the embodiments described above, an image acquired by the image input module 10702 is stored in the image storage module 10704 and is associated with the corresponding color layout descriptor via an image ID stored in the search information database 10706. However, a registered image need not necessarily be stored in the image storage module 10704. For example, the image itself may exist on an Internet server and the address of the image written in the search information database 10706 may be the Internet address of the server.

Further, in the foregoing embodiments, the image search processing is such that a target image is selected and thumbnail images that resemble this image are displayed in order of decreasing similarity. However, an embodiment is conceivable in which the target image is given as a handwritten sketch, the color layout descriptor of the handwritten image is calculated and similar images are retrieved based upon this color layout descriptor and the color layout descriptors of the registered images.

Further, an embodiment is conceivable in which an image that has not been registered in the image storage module 10704 is designated, the color layout descriptor of this image is calculated and then similar images are retrieved.

Further, in the above embodiments, when a list of thumbnail images is displayed as the results of a similar-image search, the thumbnail images are stored in a field of the image storage module 10704. However, there is no limitation upon how these images are retained. The thumbnail images may exist in the form of files and may be associated with image IDs or with data files of the original images.

Furthermore, in accordance with scaling processing of an image according to these embodiments, it is possible to create thumbnail images of excellent quality as viewed by the human eye. Block images are not limited to those of a fixed size of 8×8 pixels; an original image may be divided into blocks of different sizes in conformity with the vertical and horizontal dimensions of the original image, and a representative color may be decided, in the manner described above, for each image block obtained by such division.

[Other Embodiments]

The present invention described based upon the foregoing embodiments can be applied to a system constituted by a plurality of devices or to an apparatus comprising a single device.

Furthermore, there are cases where the object of the invention is attained also by supplying a software program, which implements the functions of the flowcharts described in each of the foregoing embodiments, directly or remotely to a system or apparatus that operates as the above-described image search apparatus, reading the supplied program codes with a computer of the system or apparatus, and then executing the program codes. In this case, so long as the system or apparatus has the functions of the program, the mode of implementation need not rely upon a program.

Accordingly, since the functions of the present invention are implemented by computer, the program codes per se installed in the computer also implement the present invention. In other words, the claims of the present invention also cover a computer program that is for the purpose of implementing the functions of the present invention.

In this case, so long as the system or apparatus has the functions of the program, the form of the program, e.g., object code, a program executed by an interpreter or print data supplied to an operating system, etc., does not matter.

Examples of storage media that can be used for supplying the program are a floppy disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the program, the client computer can be connected to a Web page on the Internet using a browser possessed by the client computer, and the computer program per se of the present invention or an automatically installable compressed file of the program can be downloaded to a recording medium such as a hard disk. Further, the program of the present invention can be supplied by dividing the program code constituting the program into a plurality of files and downloading the files from different Web pages. In other words, a WWW (World Wide Web) server that downloads, to multiple users, the program files that implement the functions of the present invention by computer also is covered by the claims of the present invention.

Further, it is also possible to store the program of the present invention on a storage medium such as a CD-ROM upon encrypting the program, distribute the storage medium to users, allow users who meet certain requirements to download decryption key information from a Web page via the Internet, and allow these users to run the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

Thus, in accordance with each of the foregoing embodiments, it is possible to generate a scaled image that represents well the features of the image that is to be scaled Further, in accordance with each of the foregoing embodiments, it is possible to calculate a feature value (color layout descriptor) that represents well the color layout of an image.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for generating a scaled image, comprising:
    image dividing means for dividing an image into a plurality of blocks;
    color-space dividing means for dividing a color space of the image into a plurality of sub spaces;
    histogram calculation means for performing a histogram calculation, on a per-subspace basis, with regard to pixels constituting a block of interest among the plurality of blocks;
    merge determination means for, in a case where it is determined that two most frequent subspaces exist and are not contiguous or that three or more most frequent subspaces exist based on a result of the histogram calculation, determining whether an other contiguous subspace can be merged with the most frequent subspaces to form a unified subspace;
    subspace merging means for, if it is determined by said merge determination means that the other contiguous subspace can be merged, merging the other contiguous subspace with a corresponding most frequent subspace to generate the unified subspace; and
    calculating means for calculating a most frequent unified subspace by adding up frequencies of subspaces based upon the histogram calculation with regard to the unified subspace generated by said subspace merging means;
    average obtaining means for obtaining an average color of pixels that belong to the most frequent unified subspace; and
    color decision means for deciding a representative color of the block of interest in accordance with the average color obtained by said average obtaining means.

2. An apparatus for calculating features of an image, comprising:
    the apparatus for generating a scaled image set forth in claim 1; and
    image feature calculation means for calculating a descriptor based upon a scaled image generated by said apparatus for generating a scaled image, and for retaining at least the descriptor and the scaled image in an associated state,
    wherein the descriptor represents a color-layout feature of the scaled image.

3. The apparatus according to claim 2, wherein said image feature calculation means includes:
    color-space transformation means for transforming the scaled image, which has been generated by said apparatus for generating a scaled image, to a Y, Cb, Cr color space;
    arithmetic means for applying DCT processing to each component in the Y, Cb, Cr color space to obtain DCT coefficients, and for applying quantization processing to the DCT coefficients obtained as a result of the DCT processing to produce quantized DCT coefficients; and
    coefficient selection means for selecting, as the descriptor representing the color-layout feature of the scaled image, coefficients of a prescribed quantity from a low-frequency component side of the quantized DCT coefficients obtained from said arithmetic means, the quantized DCT coefficients being quantized for each component in the Y, Cb, Cr color space, and for retaining at least the descriptor and the scaled image in associated form.

4. The apparatus according to claim 3, further comprising similarity calculation means for calculating, based upon descriptors selected by said coefficient selection means with regard to two original images, a degree of similarity between the two original images.

5. The apparatus according to claim 4, wherein said similarity calculation means:
    sums values obtained by weighting squares of differences between corresponding coefficients that have been selected as the descriptors with regard to respective ones of the two original images to obtain sum results, wherein the weighting applied depends upon the positions of the corresponding coefficients;
    takes square roots of the sum results, thereby acquiring Y, Cb, Cr components;
    adds up values corresponding to the Y, Cb, Cr components to thereby obtain a component sum; and
    adopts the component sum as a distance between the two original images.

6. A method for generating a scaled image, comprising:
    an image dividing step of dividing an image into a plurality of blocks;
    a color-space dividing step of dividing a color space of the image into a plurality of subspaces;
    a histogram calculation step of performing a histogram calculation, on a per-subspace basis, with regard to pixels constituting a block of interest among the plurality of blocks;
    a merge determination step of, in a case where it is determined that two most frequent subspaces exist and are not contiguous or that three or more most frequent subspaces exist based on a result of the histogram calculation, determining whether an other contiguous subspace can be merged with the most frequent subspaces to form a unified subspace;
    a subspace merging step of, if it is determined in said merge determination step that the other contiguous subspace can be merged, merging the other contiguous subspace with a corresponding most frequent subspace to generate the unified subspace;
    a calculation step of calculating a most frequent unified subspace by adding up frequencies of subspaces based upon the histogram calculation with regard to the unified subspace generated in said subspace merging step;
    an average obtaining step of obtaining an average color of pixels that belong to the most frequent unified subspace; and a color decision step of deciding a representative color of the block of interest in accordance with the average color obtained in said average obtaining step.

7. A method for calculating features of an image, comprising:
the method for generating a scaled image set forth in claim 6; and
an image feature calculation step of calculating a descriptor based upon a scaled image generated by said method for generating a scaled image, and retaining at least the descriptor and the scaled image in an associated state,
wherein the descriptor represents a color-layout feature of the scaled image.

8. The method according to claim 7, wherein said image feature calculation step includes:
a color-space transformation step of transforming the scaled image, which has been generated by said method for generating a scaled image, to a Y, Cb, Cr color space;
an arithmetic step of applying DCT processing to each component in the Y, Cb, Cr color space to obtain DCT coefficients, and applying quantization processing to the DCT coefficients obtained as a result of the DCT processing to produce quantized DCT coefficients; and
a coefficient selection step of selecting, as the descriptor representing the color-layout feature of the scaled image, coefficients of a prescribed quantity from a low-frequency component side of the quantized DCT coefficients, the quantized DCT coefficients being quantized for each component in the Y, Cb, Cr color space, and retaining at least the descriptor and the scaled image in associated form.

9. A computer-readable storage medium storing a program that when executed causes a computer to perform a method for generating a scaled image, wherein the method comprises:
an image dividing step of dividing an image into a plurality of blocks;
color-space dividing step of dividing a color space of the image into a plurality of subspaces;
a histogram calculation step of performing a histogram calculation, on a per-subspace basis, with regard to pixels constituting a block of interest among the plurality of blocks;
a merge determination step of, in a case where it is determined that two most frequent subspaces exist and are not contiguous or that three or more most frequent subspaces exist based on a result of the histogram calculation, determining whether an other contiguous subspace can be merged with the most frequent subspaces to form a unified subspace;
a subspace merging step of, if it is determined in said merge determination step that the other contiguous subspace can be merged, merging the other contiguous subspace with a corresponding most frequent subspace to generate the unified subspace;
a calculation step of calculating a most frequent unified subspace by adding up frequencies of subspaces based upon the histogram calculation with regard to the unified subspace generated in said subspace merging step;
an average obtaining step of obtaining an average color of pixels that belong to the most frequent unified subspace; and
a color decision step of deciding a representative color of the block of interest in accordance with the average color obtained in said average obtaining step.

10. The computer-readable storage medium set forth in claim 9,
wherein the method further comprises an image feature calculation step of calculating a descriptor, based upon a scaled image generated by the computer in performing the method for generating a scaled image, and retaining at least the descriptor and the scaled image in an associated state, and
wherein the descriptor represents a color-layout feature of the scaled image.

* * * * *

UNITED STATES PATENT AND TRADEMARK OFFICE
CERTIFICATE OF CORRECTION

PATENT NO. : 7,027,646 B2
APPLICATION NO. : 10/103627
DATED : April 11, 2006
INVENTOR(S) : Hirotaka Shiiyama It is certified that error appears in the above-identified patent and that said Letters Patent is hereby corrected as shown below:

TITLE PG,
[56] REFERENCES CITED

Foreign Patent Documents
    "JP 08331373 A * 12/1996" should read --JP 8-331373 A * 12/1996--.

COLUMN 5

Line 40, "apparatus an" should read --apparatus and,--.

COLUMN 11

Line 14, "bin" (first occurrence) should read --bins--.

COLUMN 13

Line 66, "image" should read --images--.

COLUMN 14

Line 31, "image" should read --images--.

COLUMN 15

Line 23, "(step S11301). That" should read --(step S11301), that--.

COLUMN 19

Line 35, "an other" should read --another--.
    Line 42, "and" should be deleted.

UNITED STATES PATENT AND TRADEMARK OFFICE
CERTIFICATE OF CORRECTION

PATENT NO. : 7,027,646 B2
APPLICATION NO. : 10/103627
DATED : April 11, 2006
INVENTOR(S) : Hirotaka Shiiyama It is certified that error appears in the above-identified patent and that said Letters Patent is hereby corrected as shown below:

COLUMN 20

Line 51, "an other" should read --another--.

COLUMN 21

Line 40, "color-space" should read --a color-space--.

COLUMN 22

Line 9, "an other" should read --another--.

Signed and Sealed this

Seventeenth Day of October, 2006

JON W. DUDAS
*Director of the United States Patent and Trademark Office*